United States Patent [19]

Gerber et al.

[11] Patent Number: 5,189,936

[45] Date of Patent: Mar. 2, 1993

[54] CONVEYOR FOR SUPPORTING AND ADVANCING SHEET MATERIAL AND CUTTING MACHINE INCLUDING SUCH CONVEYOR

[75] Inventors: Heinz J. Gerber; Lawrence S. Wolfson, both of West Hartford, Conn.

[73] Assignee: Gerber Garment Technology, Inc., Tolland, Conn.

[21] Appl. No.: 681,862

[22] Filed: Apr. 5, 1991

[51] Int. Cl.⁵ .................... B26D 7/20; B65G 17/06
[52] U.S. Cl. ................................ 83/409; 83/152; 83/155; 83/451; 83/941; 198/851
[58] Field of Search ............... 83/155, 409, 451, 941, 83/152; 198/851, 853

[56] References Cited

U.S. PATENT DOCUMENTS

| | | | |
|---|---|---|---|
| 669,979 | 3/1901 | Bucknam | 198/851 X |
| 1,136,578 | 4/1915 | Ayres | 198/853 |
| 1,800,432 | 1/1929 | Buck | 198/853 |
| 1,971,553 | 8/1930 | Fisk | 198/851 |
| 2,419,321 | 2/1946 | Lopes | 198/853 |
| 2,584,134 | 2/1952 | Knutson | 198/851 X |
| 2,593,324 | 4/1952 | Mann | 198/851 |
| 4,646,911 | 3/1987 | Pearl et al. | 198/689.1 |
| 4,685,363 | 8/1987 | Gerber | 83/451 X |
| 4,730,526 | 3/1988 | Pearl et al. | 198/689.1 X |
| 4,768,763 | 9/1988 | Gerber | 269/21 |
| 4,893,709 | 1/1990 | Schroeder et al. | 198/627 |

FOREIGN PATENT DOCUMENTS 0271116 6/1988 European Pat. Off. .

Primary Examiner—Frank T. Yost
Assistant Examiner—Clark F. Dexter
Attorney, Agent, or Firm—McCormick, Paulding & Huber

[57] ABSTRACT

In a conveyor apparatus for supporting and advancing sheet material, such as fabric to be cut by a cutter head, the conveying element is an endless belt made of elongated supporting members having their length dimensions extending transversely of the path of belt movement. The supporting members include coengagable parts, such as tongues and grooves extending along the length of the members, which coengage one another when the supporting members are in the upper run of the conveyor to prevent vertical movement of the supporting members relative to one another and to thereby maintain the supporting surface defined by the upper run in a smooth and flat condition.

20 Claims, 6 Drawing Sheets

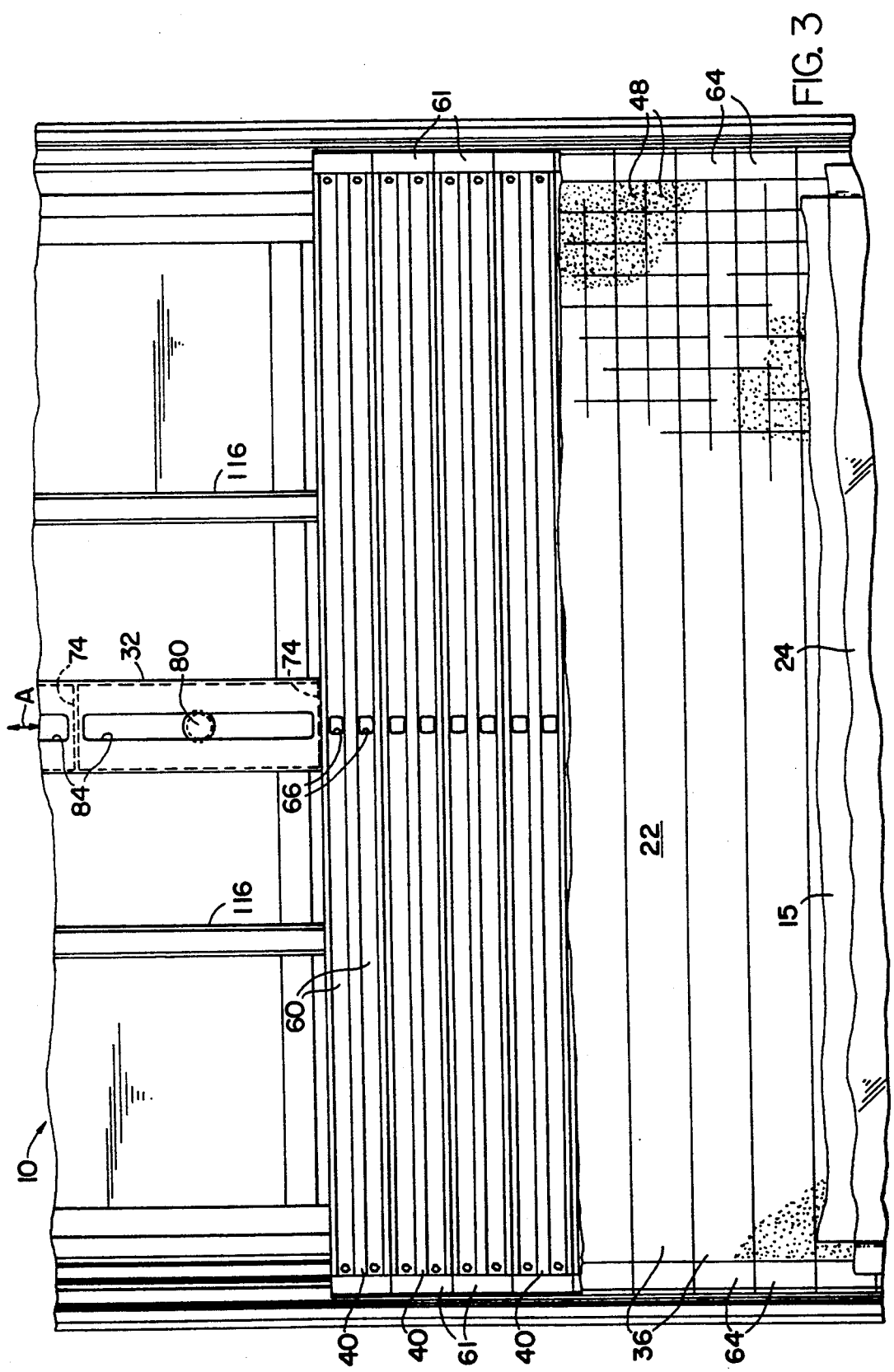

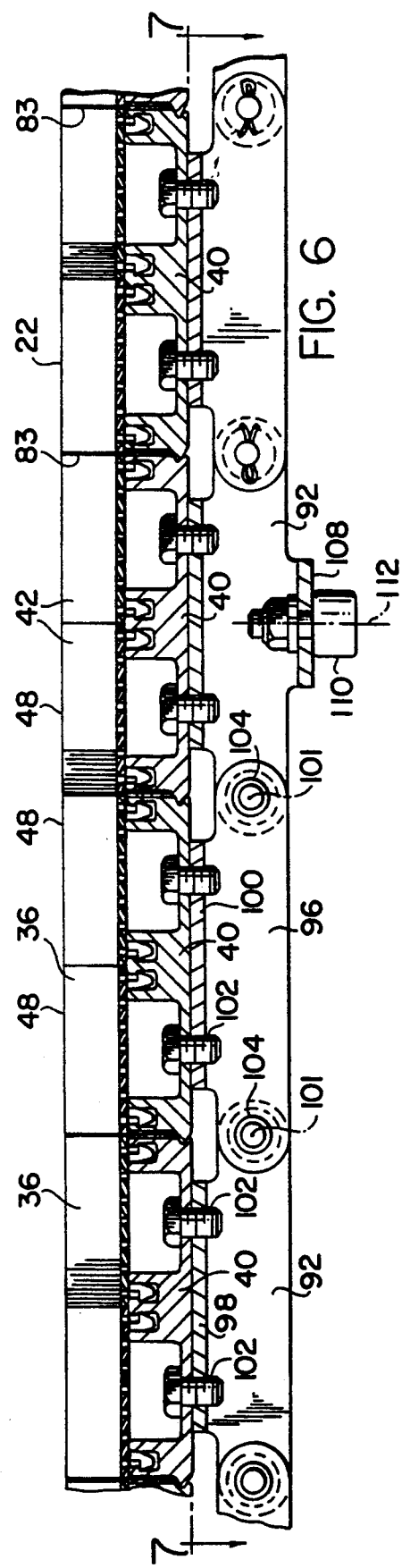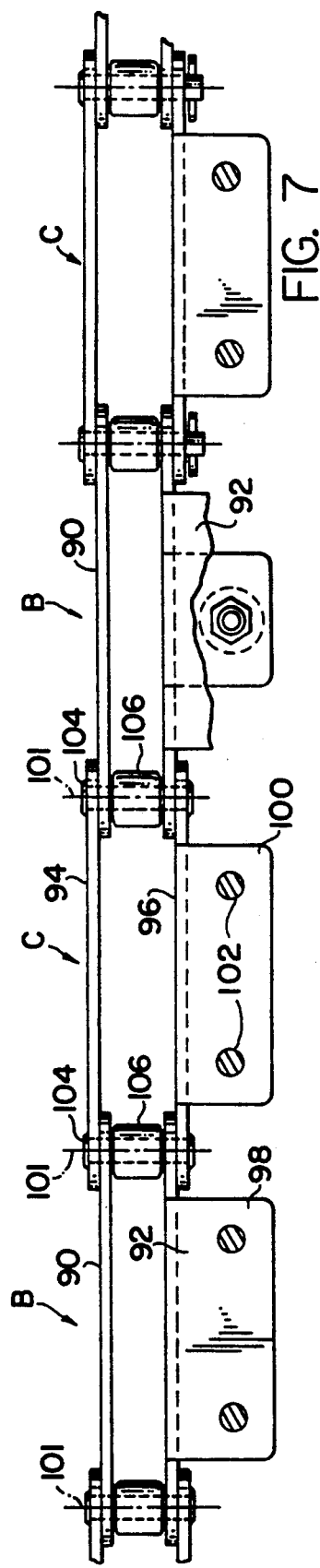

CONVEYOR FOR SUPPORTING AND ADVANCING SHEET MATERIAL AND CUTTING MACHINE INCLUDING SUCH CONVEYOR

BACKGROUND OF THE INVENTION

This invention relates to a sheet material conveying and cutting apparatus of the type shown in prior U.S. Pat. Nos. 4,646,911 and 4,730,526 wherein an endless conveyor belt made up of interconnected slat-like support members is used to support and advance sheet material to and from a cutting station, and deals more particularly with improvements in such apparatus for causing the upper material supporting run of the conveyor belt to have and maintain a smooth and flat material supporting surface.

The conveyor of the invention has special utility and novelty in forming part of a cutting machine, such as shown in U.S. Pat. Nos. 4,646,911 and 4,730,526, for automatically cutting lay-ups or single layers of limp fabric or similar sheet material and having a vacuum means for holding down and compressing the sheet material during the cutting procedure. Therefore, the conveyor is herein disclosed and described and claimed in some claims as part of such cutting machine. However, the conveyor may also be used in other applications for supporting and advancing sheet material and there is no intention to limit the scope of the invention as defined by the broader claims of this application to only cutting machines.

In the use of endless conveyors for supporting and advancing sheet material it is often necessary, or at least very desirable, especially in the case of cutting machines, that the material be supported and advanced by a supporting surface which remains quite smooth and flat, both when the belt is moving and when not moving, so as to not disturb the shape or position of the supported and advanced material. Where the conveyor belt is comprised of relatively long interlinked support members extending transversely of the belt's path of movement a tendency exists for the support members to sag transversely under their own weight and the weight of the supported sheet material. Because of this and other factors, such as possible looseness in the joints pivotally connecting the support members to one another, the support members when positioned in the material supporting upper run of the conveyor may move vertically relatively to one another and/or may tilt out of a horizontal plane to cause the supporting surfaces of neighboring support members to become vertically misaligned with one another and to produce irregularities and discontinuities in the total composite supporting surface of the upper run.

The general object of this invention is therefore to provide a simple means for preventing the support members of the endless conveyor belt of a sheet material supporting and advancing conveyor apparatus from moving vertically relative to one another while positioned in the upper run of the conveyor and for thereby maintaining a smooth and substantially flat supporting surface for the sheet material.

Other objects and advantages of the invention will be apparent from the following detailed description of a preferred embodiment thereof taken in conjunction with the accompanying drawings and claims.

SUMMARY OF THE INVENTION

The invention resides in a conveyor apparatus for supporting and advancing sheet material using an endless conveyor belt made up of interlinked elongated support members extending horizontally and transversely of the path of belt movement with adjacent ones of the support members having interengagable parts which as adjacent ones of the support members are moved into the upper material supporting run of the conveyor belt engage one another throughout the lengths of the support members with a wedging action to bring such adjacent support members into a desired vertical relationship with one another at which their upwardly facing support surfaces are coplanar and which interengagable parts when the support members are positioned in the upper material supporting run of the conveyor belt engage one another to hold adjacent ones of the support members in said given vertical relationship with one another throughout their lengths to maintain the coplanar relationship of their supporting surfaces and to increase the strength of each support member against sagging along its length.

The invention more particularly resides in the coengagable parts between adjacent support members being a wedged shaped groove formed in one of the members extending along the length of the member and a complementary wedged shaped tongue on the other of the support members extending along the length of that member, the tongue and groove becoming disengaged from one another as the adjacent support members move over either one of the rotatable end units of the conveyor and being engaged with one another as the adjacent support members move along the upper run of the conveyor.

The invention still further resides in each support member including a rigid metallic slat, with said groove being formed in the metallic slat of one of said adjacent support members and with said tongue being formed on the metallic slat of the other of said adjacent support members.

The invention also resides in the combination of the conveyor apparatus with other parts of a sheet material cutting apparatus for use in precisely moving sheet material to and from a cutting station at which it is cut by a cutting tool movable in X and Y coordinates relative to it.

The invention still further resides in other details of construction defined in the appended claims.

BRIEF DESCRIPTION OF THE DRAWINGS

FIG. 3 is a fragmentary plan view of the conveyor apparatus of FIG. 1 with parts being shown progressively broken away to reveal the structure of underlying parts.

FIG. 6 is an enlarged scale fragmentary longitudinal vertical sectional view of the endless belt of FIG. 4 taken on the line 6—6 of FIG. 4.

FIG. 7 is a horizontal sectional view taken on the line 7—7 of FIG. 6 and showing the means interlinking the support members of the endless conveyor belt to one another along one side of the belt.

DETAILED DESCRIPTION OF THE PREFERRED EMBODIMENT

Figure 1:
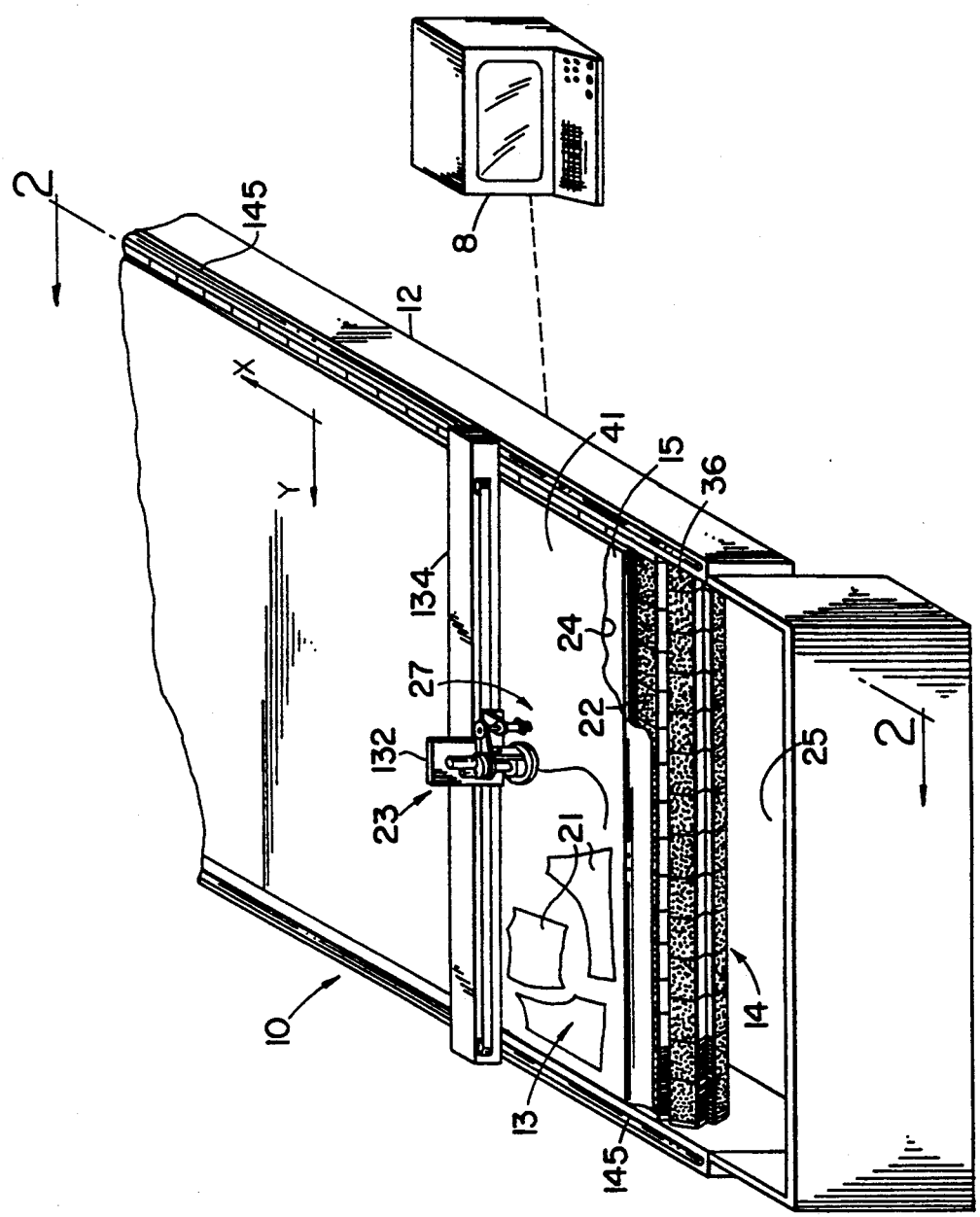
FIG. 1 is a fragmentary perspective view of an automatically controlled cloth cutting machine using a sheet material supporting and advancing conveyor apparatus embodying this invention.

Turning to the drawings and first considering FIGS. 1 and 2, a sheet material supporting and advancing conveyor apparatus is there shown as part of an automatically controlled machine for cutting cloth or similar sheet material for the purpose, for example, of creating pattern pieces later sewn or otherwise joined to one another to form garments. The illustrated machine includes a table 10 having a stationary frame 12 supporting a sheet material supporting and advancing conveyor apparatus 13. The sheet material supported by the conveyor 13 is shown as a lay-up 15 consisting of a number of layers of sheet material spread on top of one another, but if desired the apparatus may also be used with a single layer of sheet material instead of the illustrated lay-up 15.

The conveyor 13 includes an endless conveyor belt 14. This belt is trained over two rotatable end units, indicated schematically at 17 and 18 in FIG. 2, so as to be formed into a material supporting and advancing upper run 19 and a return or lower run 20 with the upper run 19 being movable along a horizontal path indicated by the double arrow A of FIG. 2 between the end units 17 and 18. The end units 17 and 18 are rotatable about parallel horizontal axes fixed relative to the frame 12 and include suitable sprockets for engaging and guiding the belt 14. At least one of the end units is driven by a suitable electric drive motor or the like (not shown) to effect movement of the belt when wanted.

For cutting the sheet material 15 supported by the conveyor 13 the table 10 has associated with it a cutter head, indicated generally at 23, supported for movement in X and Y coordinate directions in a plane parallel to the top surface of the material, thereby permitting two dimensional shapes such as the indicated pattern pieces 21 of FIG. 1 to be cut from the material at a cutting station 27 fixed relative to the frame 12. The cutter head 23 is preferably one having a vertically reciprocated cutting knife which during a cutting procedure extends vertically through the material 15 and which throughout at least a portion of its stroke extends to some extent below the lower face of the material. To permit such extension of the cutting knife below the lower face of the material, the endless belt 14 is so constructed that the upwardly facing horizontal sheet material supporting surface 22 provided by the upper run 19 is one easily penetrable by the knife. Also, as explained in more detail hereinafter, the table 10 is one including a means for supplying vacuum to at least the portion of the upwardly facing material supporting surface 22 located in the vicinity of the cutter head 23. In conjunction with this vacuum means the material 15 is also preferably overlaid by a sheet 24 of thin air impermeable plastic so that the sheet 24 is drawn downwardly to compress the material 15 at least in the vicinity of the cutter head 23 to condition the material for easier cutting by the cutter head and to aid in holding it in place on the supporting surface 22.

In the illustrated case of FIG. 1 the cutter head 23 is supported for movement in the X coordinate direction by an X carriage 134 extending across the table and supported at opposite ends by guides 145 fixed to the table frame 12 and extending longitudinally thereof. The X carriage 134 supports a Y carriage 132 for movement in the Y coordinate direction relative to the X carriage 134, with the Y carriage 132 carrying the cutter head 23. Operation of the cutter head, the material supporting and advancing apparatus 13, and other components of the system is controlled in known fashion by an associated computerized controller 8 shown in FIG. 1 and forming part of the overall system. The end of the sheet material supporting and advancing apparatus 13 shown in FIG. 1 is its discharge end and, as illustrated, a collecting hopper 25 may be arranged at this end to collect both the cut pattern pieces 21 and the waste material moved past the illustrated end. Of course, if desired, many other different means may be associated with the illustrated discharge end of the apparatus for dealing with the cut pattern pieces and waste material.

Figure 2:
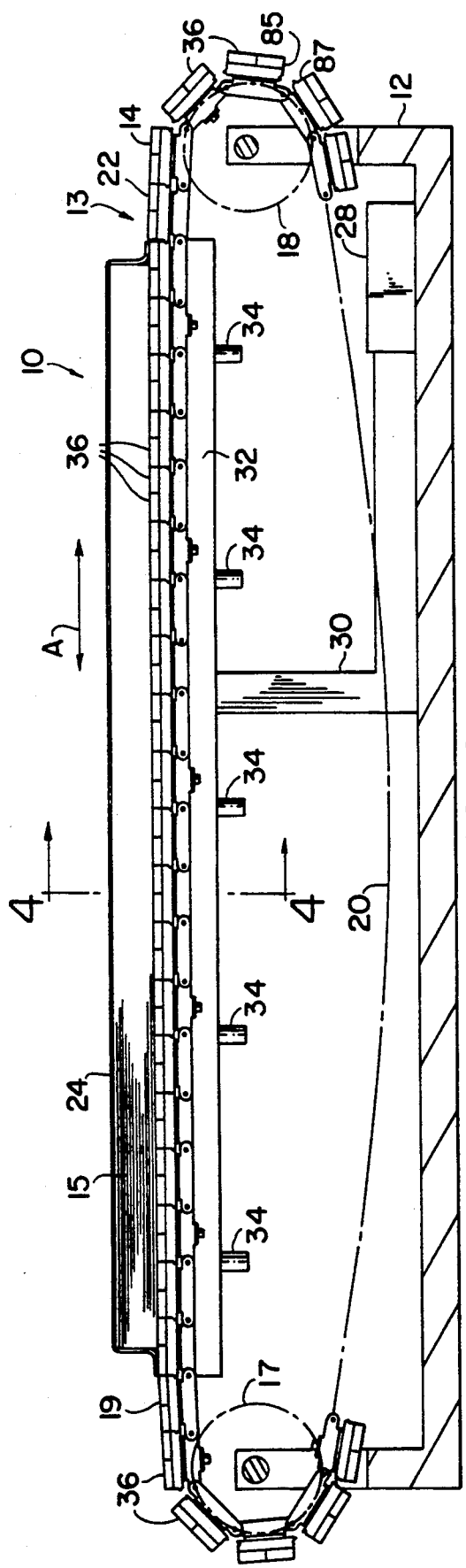
FIG. 2 is a vertical sectional view taken generally on the line 2—2 of FIG. 1 with the cutter head and some other parts being removed for clarity and with some other parts being shown schematically.

Referring to FIG. 2, the unit shown at 28 is a vacuum source, such as a motor driven turbine, providing vacuum pressure in a connecting pipe 30 communicating with a vacuum supply duct 32 located below and extending along a major portion of the length of the upper run 19 of the belt 14. Associated with the supply duct 32 are a number of electric solenoid valve operators 34, the actuations of which are controlled in response to the position of the X carriage 134 in the X coordinate direction relative to the frame 12, which operate valves within the duct 32 to selectively apply the vacuum pressure to different sections of the upwardly facing material supporting surface 22, as will be more evident from the following description.

Reference is now made to FIGS. 2 to 7 for a description of the general construction of the endless conveyor belt 14. As shown in these figures the belt 14 consists of a plurality of support members 36, interconnected to one another to form the belt, each of which is of substantially rectangular shape in plan, as seen in FIG. 3, with each member as seen in FIG. 3 having a length many times greater than its width and having its length dimension extending horizontally and transversely of the table 10, that is transversely of the path of movement A of the conveyor belt. In a specific case, for example, each support member may be 4 inches wide and over 80 inches long.

Each support member 36 is an assembly of parts. The principle structural one of these parts is an elongated rigid metallic slat 40 which preferably and as shown may be made as an extrusion of aluminum or similar extrudable metal. Attached to the upper face of each slat 40, as seen in FIGS. 4, 5, 6, and 8, are a plurality of bristle squares 42. These bristle squares may be generally similar to those shown by U.S. Pat. No. 4,685,363. Each is made of a molded plastic material and includes a base portion 44 and a plurality of bristles 46 extending upwardly from and integral with the base portion. The upper ends of the bristles 46 of all of the bristle squares 42 attached to a slat 40 terminate in a common upper plane and define the material supporting surface 48 of the support member 36.

Figure 9:
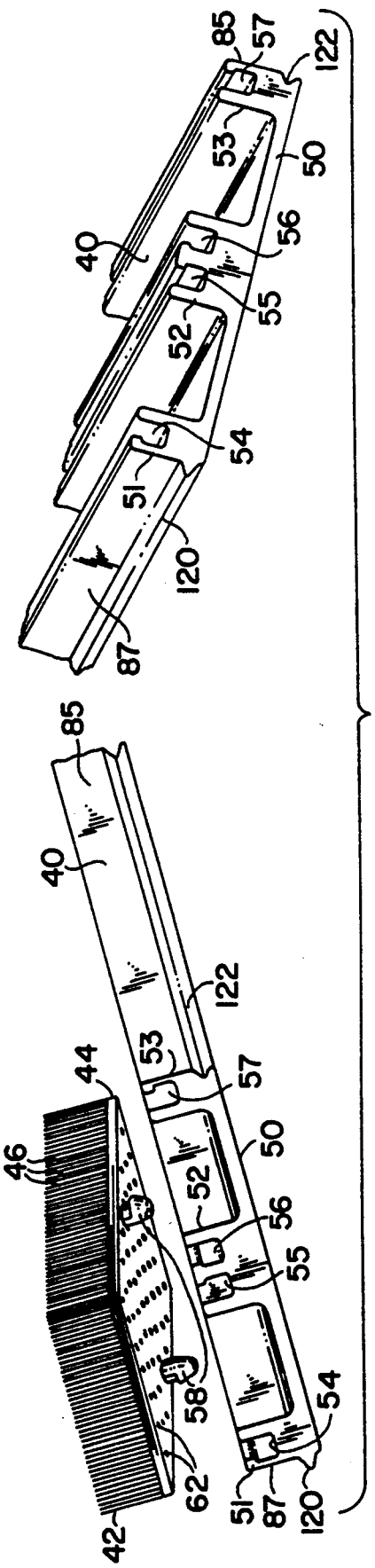
FIG. 9 is a fragmentary perspective exploded view of the slat members of two adjacent ones of the support members of the apparatus of FIG. 1.

As seen best in FIGS. 3 and 9, each bristle square 42 is square in shape as seen in plan, and when a full complement of such squares are attached to a slat 40 they closely abut one another so that the supporting surface 48 formed by the upper ends of their bristles is substantially smooth and uninterrupted. In the illustrated case each bristle square has a side dimension equal to one half the width of a slat so that across its width each slat accommodates two rows of bristle squares each extending along the length of the slat. That is, if each slat has a width of 4 inches the bristle squares are 2 inches square. However, the construction of each slat is such that instead of supporting two rows of small bristle squares it may also instead support a single row of larger bristle squares. In the case where the slat has a width of 4 inches the larger bristle squares would be ones measuring 4 inches square, thereby forming a single row of bristle squares extending along the length of the slat.

Figure 8:
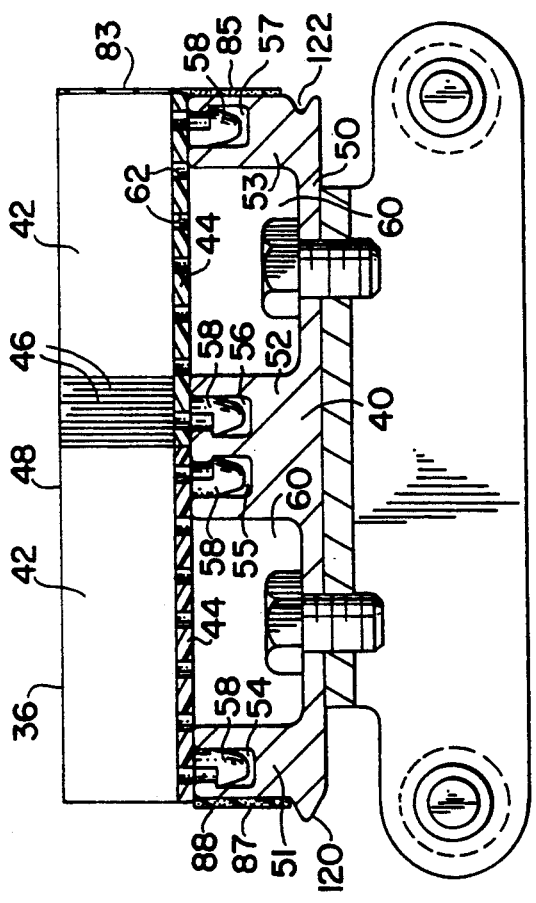
FIG. 8 is an enlarged scale view showing a single one of the support members as seen in FIG. 6.

For the attachment of the bristle squares to the slat 40, each slat, as best shown in FIGS. 8 and 9, includes a bottom wall 50 and three ribs 51, 52 and 53 extending upwardly from the bottom wall 50 and running the entire length of the slat. Each of the two ribs 51 and 53 extending respectively along the opposite long sides of the slat has a narrow mouthed groove 54 or 57 extending along its full length and the middle rib 52 has two narrow mouthed grooves 55 and 56 extending along its length, as best seen in FIG. 9. On the bottom of each bristle square 42 are two downwardly extending lugs 58 so shaped and arranged as to be receivable in either the grooves 54 and 55 or the grooves 56 and 57 to releasably hold the bristle square to the slat. That is, the two lugs 58 of each square are so complementarily shaped relative to the cross sections of the grooves that it may be attached to a slat 40 either by moving it vertically relative to the slat to cause the lugs 58 to move vertically with a snap action into either the grooves 54 and 55 or the grooves 56 and 57, or it may be assembled with a slat by first positioning the square at one end of the slat 40 so that the lugs 58 enter either the grooves 54 and 55 or the grooves 56 and 57 from the ends of those grooves, and by then sliding the square longitudinally of the slat to its desired end position. If larger bristle squares are used with a slat, that is bristle squares each having a side dimension equal to the width dimension of the slat, such bristle squares may be provided with lugs arranged so as to be received only in the end grooves 54 and 57. For example each such larger bristle square may have two lugs arranged to be received in the groove 54 and another two lugs arranged to be received in the groove 57.

As seen best in FIG. 8, the bottom wall 50 and the three upstanding ribs 51, 52 and 53 of each slat 40 in cooperation with the base portions 44 of the attached bristle squares 42 form two air passages or chambers 60 extending the length of the slat. Air communication between these chambers and the bristles 46 of the bristle squares 42 is provided by a large number of through openings 62 formed in and uniformly distributed over the base portion 44 of each bristle square.

Figure 4:
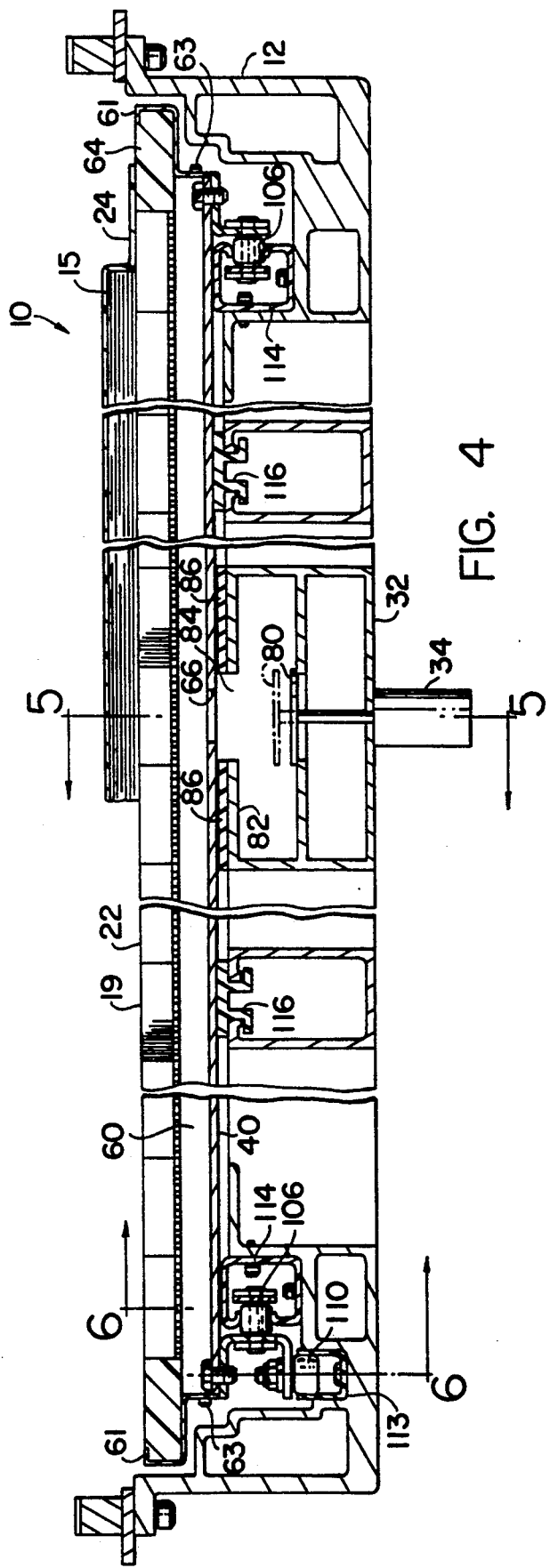
FIG. 4 is a fragmentary transverse vertical sectional view taken on the line 4—4 of FIG. 2.

At each end of a slat 40, as best seen in FIG. 4, the air chambers 60 of the slat are closed by an end piece 61 made of bent sheet metal and fastened to the end of the slat by a number of screws one of which is illustrated at 63. Each end piece 61 also holds in place an end block 64 made of a closed cell plastic material such as foamed polyethylene. The bristles of the bristle blocks attached to the slat form a penetrable bristle bed for receiving the lower end of the cutter knife. The end blocks 64 are also penetrable by the cutter knife and can receive the knife without damage to the knife if it accidently moves beyond the ends of the bristle bed. However, since the blocks 64 are of a closed cell material no air flow is lost through them. To allow for the withdrawal of air from the chambers 60 of each slat to create a vacuum pressure therein, each slat, as shown in FIG. 3, includes two vacuum openings 66 passing through its bottom wall with each being in communication with a respective one of the two longitudinally extending chambers 60 of the slat.

Figure 5:
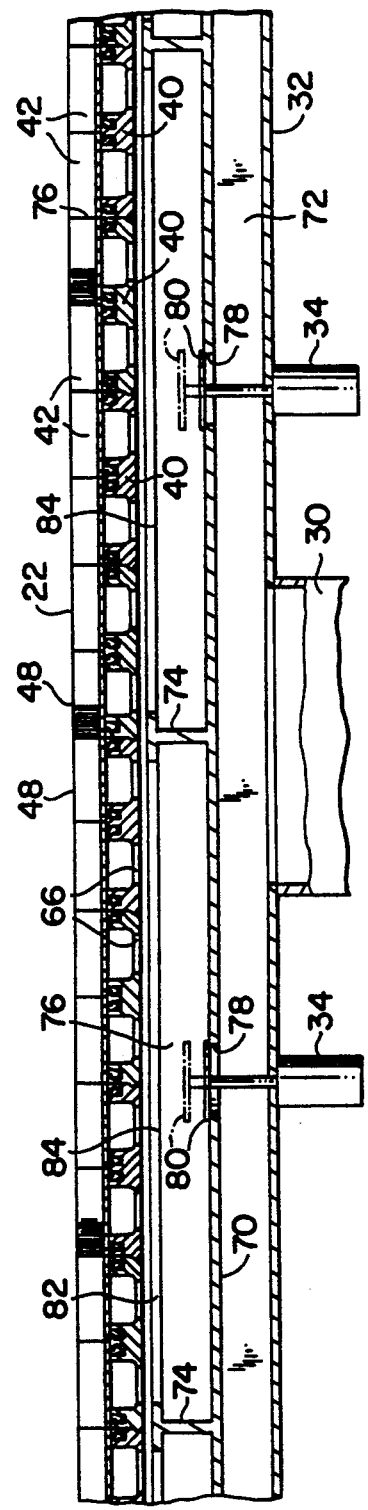
FIG. 5 is a fragmentary longitudinal vertical sectional view taken on the line 5—5 of FIG. 4.

FIGS. 4 and 5 further explain the means for transmitting vacuum pressure from the connecting pipe 30 to the composite material supporting surface 22 provided by the upper run 19 of the belt and made up of the individual supporting surfaces 48 of the individual support members 36. As shown in FIG. 5, the vacuum duct 32 is divided by a horizontal separating wall 70 into a bottom channel 72, directly communicating with the pipe 30 and extending the full length of the duct 32, and an upper portion divided by transversely extending walls 74 into a number of vacuum compartments 76 arranged adjacent to one another along the length of the duct 32. Each vacuum compartment 76 is communicable with the lower chamber 72 of the duct 32 through a valve opening 78. Each valve opening 78 has associated with it a valve member 80 movable between the illustrated open and closed positions of FIG. 5 by an associated one of the valve operators 34. The duct 32 has a horizontal upper wall 82 and for each of the vacuum compartments 76 this upper wall includes a slot 84 passing through the upper wall and extending substantially the full length of the compartment. The openings 66 in the slats are positioned so as to be aligned with the slots 84 as the slats 40 slide along the upper wall of the duct 32. As seen in FIG. 4 the upper wall 82 of the duct is preferably provided with bearing strips 86 located on either side of the slots 84 which strips 86 are made of a low friction material and have upwardly facing bearing surfaces which slidingly engage the bottom faces of the bottom walls of the slats and provide both vertical support for the slats and a good air seal to prevent leakage of outside air into the duct 32 through the interface between the strips 86 and the bottom walls of the slats.

It will be understood from FIGS. 4 and 5 that if the valve member 80 of a particular vacuum compartment 76 is moved to its open position relative to the valve opening 78 the associated compartment 76 is connected to the vacuum provided by the connecting pipe 30 so as to produce a vacuum pressure in the compartment 76 as well as in the bristles of the bristle squares of the supporting members overlying the involved vacuum compartment 76, thereby producing a vacuum over an associated portion of the composite material supporting surface 22. By controlling the valve operators 34 in response to the position of the cutter head in the X coordinate direction relative to the frame 12, as for example disclosed in U.S. Pat. No. 4,768,763, the vacuum can be selectively produced over only a portion of the entire supporting surface which portion includes the area at which the actual cutting is momentarily taking place. At the opposite ends of the table the slots do not extend the last ten to twelve inches of the duct 32 so that the duct top seals the holes 66 in the slats at the end of the table. Of course, if desired the separating wall 70, the dividing walls 74, the valves 80 and the valve operators 34 may all be omitted, and a single slot 84 may be provided in the duct 32 extending substantially the full length of the duct, except for the last ten to twelve inches of the duct at each end of the table, so as to apply vacuum pressure over substantially the full extent of the material supporting surface 22 at all times when the vacuum source 28 is operating. In cases where the table 10 is of relatively short length, that is has a length of around ten feet or less, this construction of the duct 32 with a single slot 84 is the presently preferred construction.

As best illustrated in FIG. 8, to prevent flow of air through the bristles 46 in a direction longitudinally of the table 10 and from regions beyond the portion of the supporting surface 22 vacuumized at any given moment, each supporting member along one 85 of its long side faces includes an air impermeable barrier strip 86 made, for example, of a thin sheet of gum rubber, which barrier strip extends along the associated side edge of the bristles of the supporting member and also extends downwardly below the bristles and is adhesively secured to the side face 85 of the slat 40. Adhesively attached to the other long side face 87 of the slat is a thin strip 88 of compressible foamed plastic material or the like which acts to provide an air seal between adjacent slats to prevent the entrance of outside air into the vacuum duct 32 through whatever space may otherwise occur between the adjacent slats.

Adjacent ones of the slats 40 of the support members 36 are linked to one another at two connecting points located at spaced points along their lengths, said two connecting points in the illustrated case being positioned respectively at the two ends of the support members to form the support members, into the endless belt. This means is further such that the slats pivot relative to one another about pivot axes which extend transversely of the path of movement of the belt and which, for the support members in the upper run 19, are located below the supporting surfaces 48 of the support members so that when adjacent ones of the support members pass over either one of the end units 17 and 18 their adjacent side faces 85 and 87 move apart from one another, as shown in FIG. 2, while when the adjacent support members are located in the upper run 19 their adjacent sides faces are located quite close to one another.

The means for connecting the support members 36 to one another at one of their ends is shown in FIGS. 6 and 7. The means for linking them to one another at their other ends is substantially identical to the means of FIGS. 6 and 7 and is therefore not further illustrated. Referring to FIGS. 6 and 7 the linking means shown there comprises first and second pairs B and C of links successively alternating with one another along the length of the belt. Each pair B consists of links 90 and 92 and each pair C consists of links 94 and 96. Each link pair B or C is associated with a respective one of the support members. One link 92 or 96 of each link pair includes a horizontal flange 98 or 100 attached to the bottom wall of the associated slat 40 by screws 102. Each link pair B or C is connected to the next adjacent link pair, for rotation of the involved two supporting members relative to one another about a horizontal pivot axis 101 extending transversely of the travel path A, by a horizontal pivot pin 104 extending through the four involved links and carrying a roller 106. Every other one of the links 92 further includes a horizontal flange 108 carrying a roller 110 rotatable about a vertical axis 112.

As shown best in FIG. 4, along each side of the table 10 the horizontal rollers 106 appearing in the upper run 19 are received in the mouth of an elongated guide rail 114 supported by the frame 12 and extending longitudinally of the table, the guide rail having a generally C-shaped cross section. Each guide rail 114 therefore restrains the associated rollers 106 against vertical movement in either direction relative to the guide rails while permitting them to move longitudinally of the table. Similarly, the vertical rollers 110 located along the left-hand side of the upper run of the belt, as seen in FIG. 4, are received between the upstanding arms of a U-shaped guide member 113 fixed to the frame 12 and extending the length of the table to restrain the belt against movement laterally of the table while permitting it to move longitudinally of the table. No similar vertical guide rolls and guide rail are needed for the right-hand side of the table as seen in FIG. 4, and therefore none are provided for that side. Two other elongated guide members 116 are supported by the frame 12 and slidingly engage the bottom walls of the slats 40 to provide additional vertical support for the supporting members 36.

In keeping with the invention, the support members 36 are provided with coengagable parts extending along their lengths which, when the support members form part of the upper run 19 engage one another to prevent relative vertical displacement of adjacent support members to keep the supporting surfaces 48 of the adjacent support members in vertical coplanar registration with one another along their lengths to thereby maintain a smooth flat composite supporting surface 22 extending over the entire extent of the upper run. These coengagable parts are such that they disengage from one another as the involved adjacent support members move from the upper run and pass over either one of the rotatable end units 17 and 18 of the conveyor such that they move back into engagement with one another as the involved support members move toward and reach the upper run, the coengagable parts being of complementary wedge shapes so that as adjoined support members move toward the upper run a wedging action occurs, if needed, between their coengagable parts to bring the support members into the desired vertical relationship with one another throughout their lengths, with the coengagable parts holding such relationship while the involved support members move along the upper run. To achieve this operation of the coengagable parts they are located between the axes 101, which pivotally join the support members to one another, and the supporting surfaces 48 of the support members.

The coengagable parts referred to above may take various different forms without departing from the broader aspects of the invention. Preferably, however, they are provided as wedge shaped tongues and grooves formed on and in the metallic slats of adjacent support members and extending the full length of each slat with interruption. In particular, with reference to FIGS. 6, 8 and 9, the illustrated coengagable parts comprise a tongue 120 formed on one side face 87 of each metallic slat 40 and a complementary groove 122 formed in the other side face 85 of the same slat. As two adjacent support members move over one of the end units 17 or 18 of FIG. 2 in the direction toward the upper run 19 their respective tongue and groove move into gradual engagement with one another and, if the support members or any lengthwise portions of them are not already in proper vertical relationship with one another, a wedging action occurs to bring the two support members into their desired vertical relationship with one another by the time they fully reach the upper run. When a number of support members are positioned as in FIG. 6 to form the upper run 19 of the conveyor the tongues and grooves of the adjacent slats coengage one another along the full length of the slats and prevent the slats and the remainder of the supporting members 36 from moving vertically relative to one another. Therefore, since in the upper run the supporting members are locked by the tongues and grooves against vertical movement relative to one another along their entire lengths the individual supporting surfaces 48 formed by the individual supporting members 36 are maintained in vertical coplanar alignment with one another to cause the composite supporting surface 22 taken as a whole to be smooth and uninterrupted over its entire extent. Also, while in the upper run each support member by virtue of interengaging tongues and grooves is connected along the full length of each of its sides to each of its two neighboring support members so as to be strengthened by the neighboring support members against sagging along its length in reaction to loads supported by it. As a result of this, as the lay-up 15 is supported and advanced by the upper run 19 it is not disturbed or changed in position or shape due to vertical movements of different portions of the supporting surface 22 relative to one another, and the accuracy of the cutting performed by the cutter head is not impaired.

We claim:

1. A machine for cutting sheet material, said machine comprising:

a stationary frame having a cutting station fixed relative thereto, a cutter supported by said frame at said cutting station and movable in X and Y coordinate directions relative to said frame to cut sheet material at said cutting station, an endless conveyor belt, and two rotatable end units supported by said frame and spaced apart from one another in said X coordinate direction on opposite sides of said cutting station about which end units said belt is trained to define a path of movement for said belt with an upper run and a lower run each extending between said end units, said belt comprising a plurality of elongated support members each having a length dimension and a width dimension with said length dimension extending horizontally and transversely of said path of movement and being many times longer than said width dimension which extends parallel to said path of movement, said support members being arranged in succession along said path, and means connecting said support members to one another in succession to form said support members into said belt, each of said support members when positioned in said upper run having a flat upwardly facing horizontal sheet material support surface, said means connecting said support members to one another in succession being means whereby adjacent ones of said support members are pivotally connected to each other and restrained against movement relative to one another in the direction of said path of movement of said belt at at least two connecting points spaced from one another along the lengths of the support members for pivotal movement only relative to one another about a horizontal pivot axis extending transversely to said path of movement which axis when said adjacent ones of said support members are located in said upper run is located below said support surfaces of said adjacent ones of said support members so that as said adjacent ones of said support members move over either one of said end units they are spaced apart from one another in the region between the support surfaces and said axis and as said adjacent ones of said support members move along said upper run they are spaced in said region between their support surfaces and said axis more closely to one another than they are during movement over either one of said end units, said adjacent ones of said support members said region between said axis and their support surfaces including coengagable parts which move arcuately relative to one another to become disengaged from one another as said adjacent support members move onto either one of said end units and away from said upper run, which move arcuately relative to one another to become engaged with one another as said adjacent support members move from either one of said end units and toward said upper run, and which remain in engagement with one another as said adjacent support members move along said upper run and restrain said adjacent support members from moving vertically relative to one another.

said coengagable parts being located along at least those portions of said adjacent support members extending between said two connecting points, and said coengagable parts having complementary wedge shapes whereby as said adjacent ones of said support members move onto said upper run from either one of said end units a wedging action occurs, if necessary, between said coengagable parts to move said adjacent ones of said support members, or portions thereof, vertically relative to one another to bring them into a desired vertical relationship.

2. A machine as defined in claim 1 further characterized by:

said coengagable parts included on adjacent ones of said support members being a horizontally extending groove in one of said adjacent ones of said support members and a horizontally extending complementary tongue on the other of said adjacent ones of said support members.

3. A machine as defined in claim 1 further characterized by said support members each including a rigid metallic slat, and said coengagable parts on adjacent ones of said support members including a horizontally extending groove in the slat of one of said adjacent ones of said support members and a horizontally extending complementary tongue on the slat of the other of said adjacent ones of said support members.

4. A machine as defined in claim 3 further characterized by:

each of said slats having an upper face which upper face faces upwardly when said support member is located in said upper run, and each of said support members including a plurality of bristle blocks carried by the associated slat, each of said bristle blocks having a base portion located adjacent said upper face of said slat and having a plurality of bristles extending upwardly from said base when said support member is in said upper run, the bristles of the bristle blocks carried by the slat having upper ends terminating in a common plane and defining said support surface of said support member.

5. A machine as defined in claim 4 further characterized by said upper face of said slat of each of said support members being substantially open and the remainder of said slat in combination with the base portions of the bristle blocks carried by said slat defining a substantially closed chamber located below said base portions of the bristle blocks carried by said slat, said base portions of said bristle blocks having openings passing therethrough to allow for air flow between said chamber and said bristles, and means for connecting said chamber to a source of vacuum as the associated support member moves along at least a portion of said upper run.

6. A machine as defined in claim 5 further characterized by:
said means for connecting said chamber to a vacuum source including a vacuum duct connected to a source of vacuum and extending along at least a portion of said upper run and located below the slats of those support members located in said upper run, said slats each having a bottom wall with an opening therein, said vacuum duct having an upper wall with an opening therein, said vacuum duct being arranged so that said bottom walls of said slats slide over said upper wall of said vacuum duct as they move along said upper run, and said openings in said bottom walls in said slats being so located that they register with said opening in said upper wall of said vacuum duct to provide for airflow between said vacuum duct and said chamber of a support member during at least a portion of the movement of that support member along said upper run.

7. A machine for cutting sheet material, said machine comprising:
a stationary frame having a cutting station fixed relative thereto,
a cutter supported by said frame at said cutting station and movable in X and Y coordinate directions relative to said frame to cut sheet material at said cutting station,
an endless conveyor belt,
two end units horizontally spaced apart from one another in said X coordinate direction on opposite sides of said cutting station and supported by said frame for rotation about parallel horizontal axes, said belt being trained about said two end units to define a path of movement of said belt relative to said frame having an upper run and a lower run each extending between said end units, said upper run serving to support sheet material at said cutting station for cutting by said cutter and to move said sheet material to and from said cutting station,
said belt comprising a plurality of elongated support members extending in said Y coordinate direction and arranged in succession along said path, and means connecting said support members to one another in succession to form said support members into said belt,
each of said support members including a rigid metal slat having a length dimension extending in said Y coordinate direction and a width dimension extending in said X coordinate direction with said length dimension being many times longer than said width dimension, which slat when positioned in said upper run has an upper face, a bottom face, and two side faces all extending in said Y coordinate direction, a plurality of bristle blocks carried by the slat of each of said support members with each of said bristle blocks having a base portion located adjacent said upper face of the associated slat and a plurality of bristles extending upwardly from said base portion and terminating in a common plane to define a support surface for the support member, the support surfaces of the ones of said support members located in said upper run defining a composite substantially flat upwardly facing sheet material supporting surface for said apparatus,
said means connecting said support members to one another in succession being means whereby adjacent ones of said slats of said support members are pivotally connected to each other and restrained against movement relative to one another in the direction of said path of movement of said belt at at least two connecting points spaced from one another along the lengths of the support members for pivotal movement only relative to one another about a horizontal axis extending in said Y coordinate direction which axis when said adjacent ones of said support members are located in said upper run is located below said bottom faces of said slats so that as said adjacent ones of said support members move over either one of said end units the adjacent side faces of their slats are spaced apart from one another and as said adjacent ones of said support members move along said upper run said adjacent side faces of their slats are spaced more closely to one another than they are during movement over either one of said end units,
said adjacent side faces of said adjacent ones of said slats having coengagable parts which move arcuately relative to one another to become disengaged from one another as said adjacent ones of said support members move onto either one of said end units and away from said upper run, which move arcuately relative to one another to become engaged with one another as said adjacent ones of said support members move onto either one of said end units and toward said upper run, and which remain in engagement with one another as said adjacent ones of said support members move along said upper run and restrain said slats of said adjacent ones of said support members from moving vertically relative to one another,
said coengagable parts being located along at least those portions of said slats extending between said connecting points, and
said coengagable parts having complementary wedge shapes whereby as said adjacent ones of said support members move from either one of said end units onto said upper run a wedging action occurs, if necessary, between said coengagable parts to move the slats of said adjacent ones of said support members, or portions thereof, vertically relative to one another to bring them into a desired vertical relationship.

8. A machine for cutting sheet material as defined in claim 7 further characterized by said coengagable parts on the adjacent side surfaces of adjacent ones of said slats being a horizontally extending groove in one of said adjacent side surfaces and a complementary horizontally extending tongue on the other of said adjacent side surfaces.

9. An apparatus for supporting and advancing sheet material, said apparatus comprising:
an endless conveyor belt, and
two horizontally spaced apart rotatable end units about which said belt is trained to define a path of movement for said belt with an upper run and a lower run each extending between said end units,
said belt comprising a plurality of elongated support members each having a length dimension and a width dimension with said length dimension extending horizontally and transversely of said path of movement and being many times longer than said width dimension which extends parallel to said path of movement, said support members being arranged in succession along said path, and means connecting said support members to one another in succession to form said support members into said belt,
each of said support members when positioned in said upper run having a flat upwardly facing horizontal sheet material support surface,
said means connecting said support members to one another in succession being means whereby adjacent ones of said support members are pivotally connected to each other and restrained against movement relative to one another in the direction of said path of movement of said belt at at least two connecting points spaced from one another along the lengths of the support members for pivotal movement only relative to one another about a horizontal pivot axis extending transversely of said path of movement which axis when said adjacent ones of said support members are located in said upper run is located below said support surfaces of said adjacent ones of said support members so that as said adjacent ones of said support members move over either one of said end units they are spaced apart from one another in the region between their support surfaces and said axis and as said adjacent ones of said support members move along said upper run they are spaced more closely to one another than they are during movement over either one of said end units,
said adjacent ones of said support members in the region between said axis and their support surfaces including coengagable parts which move arcuately relative to one another to become disengaged from one another as said adjacent support members move onto either one of said end units and away from said upper run, which move arcuately relative to one another to become engaged with one another as said adjacent support members move from either one of said end units and toward said upper run, and which remain in engagement with one another as said adjacent support members move along said upper run and restrain said adjacent support members from moving vertically relative to one another,
said coengagable parts being located along at least those portions of said adjacent support members extending between said two connecting points, and
said coengagable parts having complementary wedge shapes whereby as said adjacent ones of said support members move onto said upper run from either one of said end units a wedging action occurs, if necessary, between said coengagable parts to move said adjacent ones of said support members, or portions thereof, vertically relative to one another to bring them into a desired vertical relationship.

10. An apparatus for supporting and advancing sheet material as defined in claim 9 further characterized by:
said coengagable parts included on adjacent ones of said support members being a horizontally extending groove in one of said adjacent ones of said support members and a horizontally extending complementary tongue on the other of said adjacent ones of said support members.

11. An apparatus for supporting and advancing sheet material as defined in claim 9 further characterized by said support members each including a rigid metallic slat, and said coengagable parts on adjacent ones of said support members including a horizontally extending groove in the slat of one of said adjacent ones of said support members and a horizontally extending complementary tongue on the slat of the other of said adjacent ones of said support members.

12. An apparatus for supporting and advancing sheet material as defined in claim 11 further characterized by the slat of each of the said support members having two parallel side faces extending horizontally and transversely of said path movement, one of said side faces of each slat having a horizontal extending groove for cooperation with a tongue on the slat of the support member located adjacent said one side face and the other side face of said slat having a tongue extending horizontally and transversely of said path of movement for cooperation with a groove in the slat of the support member adjacent said other side face.

13.. An apparatus for supporting and advancing sheet material as defined in claim 11 further characterized by:
each of said slats having an upper face which upper face faces upwardly when said support member is located in said upper run, and
each of said support members including a plurality of bristle blocks carried by the associated slat, each of said bristle blocks having a base portion located adjacent said upper face of said slat and having a plurality of bristles extending upwardly from said base when said support members in said upper run, the bristles of the bristle blocks carried by the slat having upper ends terminating in a common plane and defining said support surface of said support member.

14. An apparatus for supporting and advancing sheet material as defined in claim 13 further characterized by said upper face of said slat of each of said support members being substantially open and the remainder of said slat in combination with the base portions of the bristle blocks carried by said slat defining a substantially closed chamber located below said base portions of the bristle blocks carried by said slat, said base portions of said bristle blocks having openings passing therethrough to allow for air flow between said chamber and said bristles, and means for connecting said chamber to a source of vacuum as the associated support member moves along at least a portion of said upper run.

15. An apparatus for supporting and advancing sheet material as defined in claim 14 further characterized by:
said means for connecting said chamber to a vacuum source including a vacuum duct connected to a source of vacuum and extending along at least a portion of said upper run and located below the slats of those support members located in said upper run, said slats each having a bottom wall with an opening therein, said vacuum duct having an upper wall with an opening therein, said vacuum duct being arranged so that said bottom walls of said slats slide over said upper wall of said vacuum duct as they move along said upper run, and said openings in said bottom walls in said slats being so located that they register with said opening in said upper wall of said vacuum duct to provide for airflow between said vacuum duct and said chamber of a support member during at least a portion of the movement of that support member along said upper run.

16. An apparatus for supporting and advancing sheet material as defined in claim 11 further characterized by said pivot axis connecting two adjacent ones of said supporting members being so located that when said two adjacent ones of said supporting members are in said upper run said pivot axis is located at least substantially in a vertical plane passing between said two adjacent support members.

17. An apparatus for supporting and advancing sheet material as defined in claim 9 further characterized by: each of said support members including a rigid metallic slat extending horizontally and transversely of said path of movement, said coengagable parts on adjacent ones of said support members being located on the slats of said adjacent ones of said support members.

18. An apparatus for supporting and advancing sheet material as defined in claim 9 further characterized by: means for vertically supporting said support members as they move along said upper arm.

19. An apparatus for supporting and advancing sheet material as defined in claim 18 further characterized by: a stationary frame supporting said two rotatable end units for rotation relative to said frame, and said means for vertically supporting said support members including at least one guide rail fixed relative to said frame and extending parallel to said path of movement, said guide rail having at least one upwardly facing bearing surface, and the ones of said support members located in said upper run having downwardly facing support surfaces slidably engagable with said upwardly facing support surface of said guide rail.

20. An apparatus for supporting and advancing sheet material as defined in claim 19 further characterized by said means connecting said support members to one another in succession being a means whereby each of said support members is pivotally connected to a next adjacent support member for movement relative thereto about only one pivot axis so that the number of said pivot axes in said belt is equal to the number of said support members in said belt.

* * * * *